US009352705B2

(12) United States Patent
Yamamoto

(10) Patent No.: US 9,352,705 B2
(45) Date of Patent: May 31, 2016

(54) DECORATIVE PANEL AND VEHICLE INTERIOR/EXTERIOR COMPONENTS

(71) Applicant: NIHON PLAST CO., LTD., Fujinomiya-shi, Shizuoka (JP)

(72) Inventor: Kazuhisa Yamamoto, Shizuoka (JP)

(73) Assignee: NIHON PLAST CO., LTD, Fujinomiya (JP)

( * ) Notice: Subject to any disclaimer, the term of this patent is extended or adjusted under 35 U.S.C. 154(b) by 0 days.

(21) Appl. No.: 14/553,684

(22) Filed: Nov. 25, 2014

(65) Prior Publication Data
US 2015/0076852 A1    Mar. 19, 2015

Related U.S. Application Data

(63) Continuation of application No. 13/728,649, filed on Dec. 27, 2012, now Pat. No. 9,004,577.

(30) Foreign Application Priority Data

Jan. 4, 2012    (JP) ................................. 2012-000102

(51) Int. Cl.
*B60R 13/04*    (2006.01)
*B60R 13/02*    (2006.01)
(Continued)

(52) U.S. Cl.
CPC .................. *B60R 13/02* (2013.01); *B60R 13/04* (2013.01); *B29C 45/14221* (2013.01); *B29C 2793/009* (2013.01); *B29C 2793/0027* (2013.01); *B29L 2031/3041* (2013.01)

(58) Field of Classification Search
CPC . B60R 13/02; B60R 13/04; B29L 2031/3041; B29C 45/14221; B29C 2793/0027; B29C 2793/009

USPC ................... 296/191, 24.34, 1.08, 146.7, 209
See application file for complete search history.

(56) References Cited

U.S. PATENT DOCUMENTS

D136,355 S    9/1943    Stevens
3,334,007 A    8/1967    Flagan
3,495,673 A    2/1970    Yazejian
(Continued)

FOREIGN PATENT DOCUMENTS

JP    09-240386 A    9/1997
JP    2005-119404 A    5/2005
JP    2006-224406 A    8/2006

OTHER PUBLICATIONS

Foreign Search Report, Application No. GB1300062.5 dated Jun. 5, 2013.

*Primary Examiner* — Pinel Romain
(74) *Attorney, Agent, or Firm* — Arent Fox LLP

(57) ABSTRACT

The present invention provides a decorative panel including a design surface; and a circumferential edge portion that is formed so as to cross from the design surface, wherein the circumferential edge portion has a first face 7 that is continuous from the design surface along a circumferential extension direction and a second face 8 that is formed in a circumferential extension direction along the first face 7, wherein a face variation line is provided at a boundary between the first face 7 and the second face 8, wherein a decorative panel 1 is provided in such a manner that a decoration film 5 is imparted to at least a part of the design surface and a part of the circumferential edge portion, and wherein the decoration film 5 includes a trimming terminal portion CL along the face variation line.

9 Claims, 10 Drawing Sheets

(51) Int. Cl.
*B29L 31/30* (2006.01)
*B29C 45/14* (2006.01)

(56) References Cited

U.S. PATENT DOCUMENTS

| | | |
|---|---|---|
| 3,970,498 A | 7/1976 | Loew |
| 5,320,151 A | 6/1994 | Wumer |
| 6,450,277 B1 | 9/2002 | Kargilis et al. |
| 6,595,575 B2 | 7/2003 | Morris |
| 7,316,444 B2 | 1/2008 | Montagna et al. |
| 7,367,103 B2 | 5/2008 | Schoemann et al. |
| 8,056,951 B2 | 11/2011 | Schilles |
| 2006/0237994 A1 | 10/2006 | Ludwig et al. |
| 2007/0236032 A1 | 10/2007 | Osada |
| 2008/0017304 A1 | 1/2008 | Sell et al. |
| 2009/0008955 A1 | 1/2009 | Desoto |
| 2009/0058118 A1 | 3/2009 | Hein et al. |
| 2011/0291439 A1 | 12/2011 | Iwasaki |
| 2012/0200105 A1 | 8/2012 | Vasko et al. |

DECORATIVE PANEL AND VEHICLE INTERIOR/EXTERIOR COMPONENTS

CROSS-REFERENCED TO RELATED APPLICATIONS

This application is a continuation of U.S. application Ser. No. 13/728,649, filed Dec. 27, 2012, which claims priority to Japanese Patent Application No. 2012-000102, filed Jan. 4, 2012, the disclosures of the prior applications are incorporated in their entirety by reference herein.

BACKGROUND OF THE INVENTION

1. Field of the Invention

The present invention relates to a decorative panel and a vehicle interior/exterior components for a vehicle, the decorative panel being available for use in the vehicle interior/exterior components for the vehicle, such as a console box, an instrument panel, a glove box, a door trim that are included in a vehicle such as an automobile.

2. Description of the Related Art

Conventionally, a variety of decorative panels are mounted to interior components for the vehicle such as a console box, an instrument panel, a glove box, and a door trim that are included in a vehicle such as an automobile, or alternatively, an exterior components for the vehicle such as a backdoor garnish that is installed immediately above a licensed plate, the backdoor garnish incorporating an illumination for licensed plate and being used as a grip for opening or closing.

As the related art, there exist interior components for the vehicle that is made of: a foamed resin base material that is light in weight, and that has shape memory properties; a resin rib that is laminated and integrated on a back face of the foamed resin base material; and a decoration material that is laminated and integrated on a top face of the foamed resin base material, wherein a longitudinal wall portion is set at least at a part of an outer circumference of a product of the foamed resin base material, at the time of molding of the foamed resin base material a groove portion is formed at a longitudinal wall portion in the foamed resin base material by means of a die face shape of a mold die, and the groove portion is processed to be cut as a product terminal (refer to Japanese Unexamined Patent Application Publication No. 2005-119404, for example).

Japanese Unexamined Patent Application Publication No. 2005-119404 that is the related art discloses terminal processing of a door trim, the door trim being mainly mounted to a glass or a door panel. In the case of an upper part of the door trim, a resin welt or the like is applied along a slit-shaped opening that appears and disappears at the time of up and down movement of a door glass (that is formed in a very flat shape). A terminal is formed in an involved manner, and the shape that is proximal to the terminal serves as a smooth continuous face.

However, in the related art described above, it is not easy to carry out a cutting work for a circumferential face that is not constant in decorative panel, and that is not a smooth continuous face; and therefore, there can occur a problem that production costs will increase in the case where such a cutting work needs to be manually carried out, and facility costs or maintenance costs will increase in the case where such a cutting work needs to be robotically carried out.

SUMMARY OF THE INVENTION

The present invention has been made in order to the above described problem associated with the related art, and it is an object of the present invention to provide a decorative panel shape such that a trimming work can be easily carried out.

A decorative panel according to first aspect of the present invention, comprising:

a design surface; and a circumferential edge portion that is formed so as to cross from the design surface, wherein the circumferential edge portion has a first face that is continuous from the design surface along a circumferential extension direction and a second face that is formed in a circumferential extension direction along the first face, wherein a face variation line is provided at a boundary between the first face and the second face, wherein the decorative panel is provided in a manner in which a decoration film is imparted to at least a part of the design surface and a part of the circumferential edge portion, and wherein the decoration film includes a trimming terminal portion along the face variation line.

The decorative panel according to second aspect of the present invention, in the first aspect, the second face including a discontinuous portion.

The decorative panel according to third aspect of the present invention, in the first aspect, wherein the first face of the circumferential edge portion is configured so as to be inclined at an acute angle with respect to the design surface that is a top face of the decorative panel, and wherein the second face of the circumferential edge portion is inclined so as to hang down with respect to the first face, and is configured to form a substantially right angle with respect to the design surface.

The decorative panel according to fourth aspect of the present invention, in the first aspect, wherein the decoration film is configured to be involved at an acute angle on the first face.

The decorative panel according to fifth aspect of the present invention, in the first aspect, wherein the decoration film has an excess length portion that is formed on an outer circumference of a product portion that is formed in a shape of the decorative panel, the excess length portion being formed to be bent from a boundary portion between the first face and the second face, and wherein the rimming terminal portion is formed by the excess length portion being processed to be trimmed along the face variation line.

The decorative panel according to sixth aspect of the present invention, in the fifth aspect, wherein the decoration film is configured with: a preformed body having a product portion that is formed in a shape of the decoration panel; and the excess length portion that is formed at an outer circumferential portion thereof, by means of preliminary molding.

The decorative panel according to seventh aspect of the present invention, in the sixth aspect, wherein the decoration film that is made of the preformed body is integrally molded with a base material of the decorative panel and thereafter trimming processing of the excess length portion is carried out.

The decorative panel according to eighth aspect of the present invention, in the second aspect, wherein the decorative panel is formed in a knife shape, and has a curve edge side and a straight edge side, and wherein the discontinuous portions including the discontinuous portion on the second face in the circumferential edge portion are provided at least one or more on the curve edge side.

The decorative panel according to ninth aspect of the present invention, in the second aspect, wherein a mount portion configured to mount the decorative panel to a counterpart member is provided on a face that is opposite to the design surface, and wherein the discontinuous portion on the second face in the circumferential edge portion is formed at a position that is opposed to the mount portion by removing a part of the second face.

The decorative panel according to tenth aspect of the present invention, in the ninth aspect of the present invention, wherein the mount portion has a cutout, and wherein the discontinuous portion on the second face in the circumferential edge portion is formed in order to provide the cutout of the mount portion.

A vehicle interior/exterior components according to eleventh aspect of the present invention, the vehicle interior/exterior components that are provided at an interior or an exterior of the vehicle, the vehicle interior and exterior components comprising:

a decorative panel according to the first aspect to tenth aspect, having a mount portion; and a target mount portion to which the mount portion is mounted, and which is configured to attach the decorative panel to the vehicle interior/exterior components.

The decorative panel and the vehicle interior/exterior components, according to the present invention, have their own constructions as described above, and therefore, their related advantageous effects described below are attained.

(1) A trimming work of a decoration film in a circumferential face that is not constant in a decorative panel can be easily carried out.

(2) The decorative panel according to the present invention is provided in such a manner that impairment of an appearance of a decorative panel due to contraction of a film terminal can be prevented by ensuring pasting allowance of a decoration film.

(3) A portion for pasting allowance of a decoration film can be covered with a counterpart member at the time of placement of a decorative panel, thus making it possible to prevent impairment of an appearance due to pasting allowance.

DESCRIPTION OF THE PREFERRED EMBODIMENTS

Figure 1:
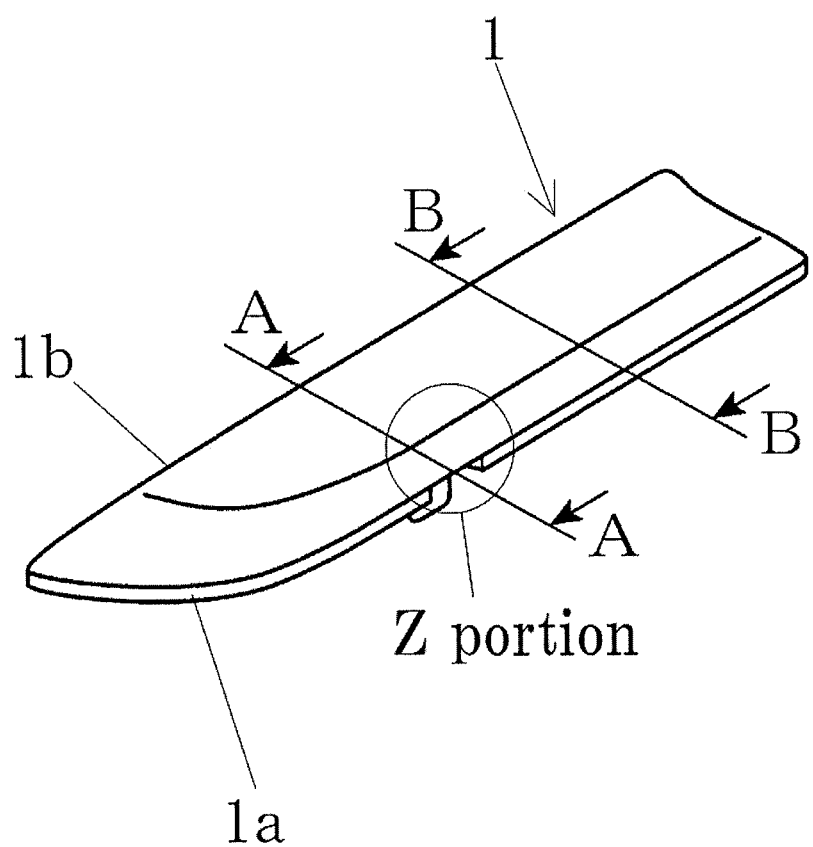
FIG. 1 shows an embodiment of a decorative panel according to the present invention, and is a schematic perspective view showing a state in which the decorative panel is seen from a curve edge side.

A grained panel (a decorative panel) 1 according to an embodiment of the present invention will be described with reference to FIG. 1 to FIG. 10.

It is to be noted that in the following description of the drawings, same or like constituent elements are designated by same or like reference numerals. However, it should be kept in mind that the drawings are schematic, and the relevant ratios or the like of the respective dimensions are different from actual ones. Therefore, specific dimensions or the like should be determined in consideration of the following description. In addition, constituent elements which are different from each other in dimensional relationships or ratios can be included in the respective drawings as well.

The decorative panel 1 according to the embodiment of the present invention is a decorative panel 1 that is provided with a design surface and a circumferential edge portion that is formed in such a manner as to cross from the design surface; the circumferential edge portion has a first face 7 that is continuous from the design surface in a circumferential extension direction and a second face 8 that is formed in a circumferential extension portion along the first face 7; a face variation line is provided on the boundary between the first face 7 and the second face 8; the decorative panel 1 is a decorative panel in which a decoration film 5 is imparted to at least a part of the design surface and a part of the circumferential edge portion; and the decoration film 5 is provided with a trimming terminal portion CL along the face variation line. In addition, the second face 8 including a discontinuous face portion 2. Further the decorative panel 1 according to the embodiment of the present invention is attached to the interior and exterior components for the vehicle, for example, to a center console 10 of interior components for the vehicle.

Figure 2:
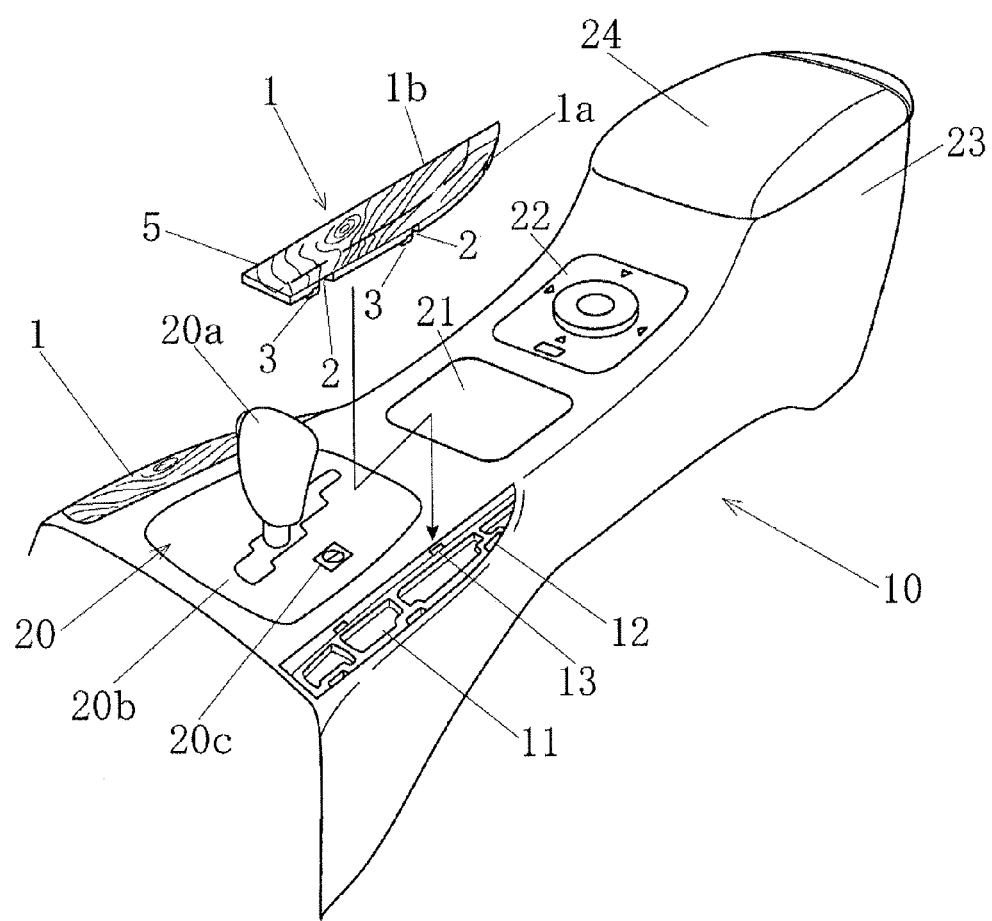
FIG. 2 is a schematic perspective view showing an embodiment of a center console configured to attach the decorative panel according to the present invention.
Figure 3:
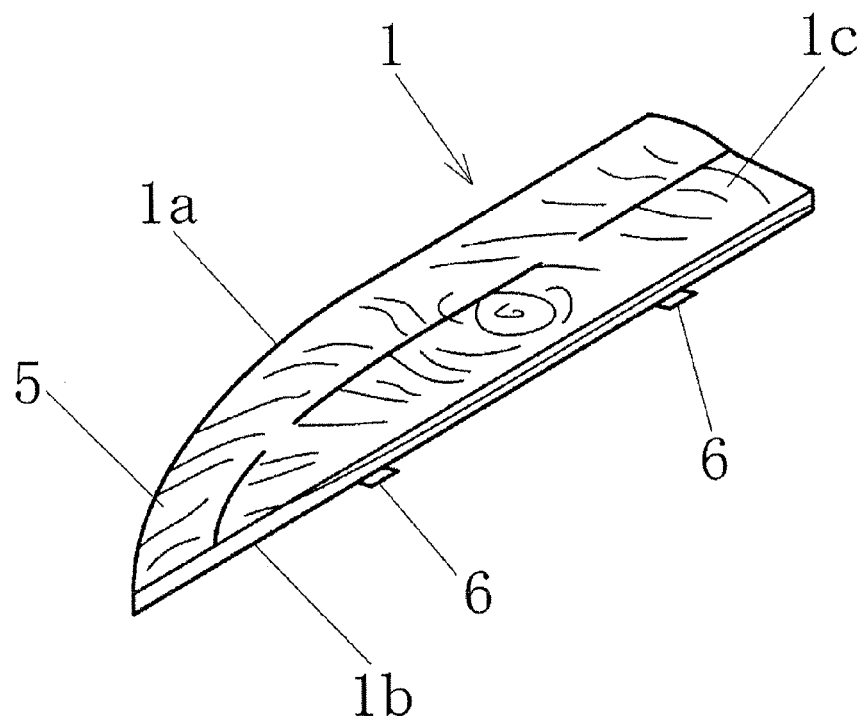
FIG. 3 shows an embodiment of the decorative panel according to the present invention, and is a schematic perspective view showing a state in which the decorative panel is seen from a straight edge side.

FIG. 1 is a schematic perspective view showing a state in which the grained panel 1 according to the present embodiment is seen from a curve edge side 1*a* that is provided outside thereof. FIG. 2 is a schematic perspective view showing an embodiment of the center console 10 configured to attach the grained panel 1 according to the present embodiment. FIG. 3 is a schematic perspective view showing a state in which the grained panel 1 according to the present embodiment is seen from a straight edge side 1*b* that is provided on a center side. It is to be noted that although not shown in FIG. 1, a grained pattern is imparted as is the case with FIG. 1.

As shown in FIG. 1 and FIG. 2, the center console 10 is installed between two front seats of a vehicle, and is provided with: a gear change operating portion 20 (including an AT knob 20*a*, an indicator panel 20*b*, and a lock/unlock key 29*c*); an ashtray 21; a selector knob portion 22 (an operation knob configured to provide setting or the like of car navigation, although not shown); a box portion 23; and a lid 24 that is compatible with an elbow rest or the like, and that is configured to cover the box portion 23. It is to be noted that the center console 10 is corresponding to the vehicle interior/exterior components, according to the present invention.

As shown in FIG. 2, a pair of grained panels 1, each of which is formed in the shape of a knife, are engaged at the left and right of the gear change operating portion 20, and a decorative effect is attained. As shown in FIG. 2 and FIG. 3, a clip 3 is provided on the curve edge side 1a when the grained panel 1 is seen as a knife, and a claw 6 is provided on the straight edge side (a non-curve edge) 1b opposite to the curve edge side 1a, and the clip 3 on the curve edge side 1a and the claw 6 on the straight edge side 1b are respectively engaged with a pit 12 and a tunnel 13 of a recessed portion 11 of the center console 10, thereby mounting the grained panel 1 to the center console 10. It is to be noted that the grained panel 1 is corresponding to the decorative panel according to the present invention, and that a top face of the grained panel 1 is corresponding to a design surface of the decorative panel according to the present invention. In addition, it is also to be noted that the clip 3 (and a clip seat 4 to be described later) is corresponding to a mount portion according to the present invention, and that the pit 12 of the recessed portion 11 of the center console 10 is corresponding to a target mount portion according to the present invention.

Figure 4:
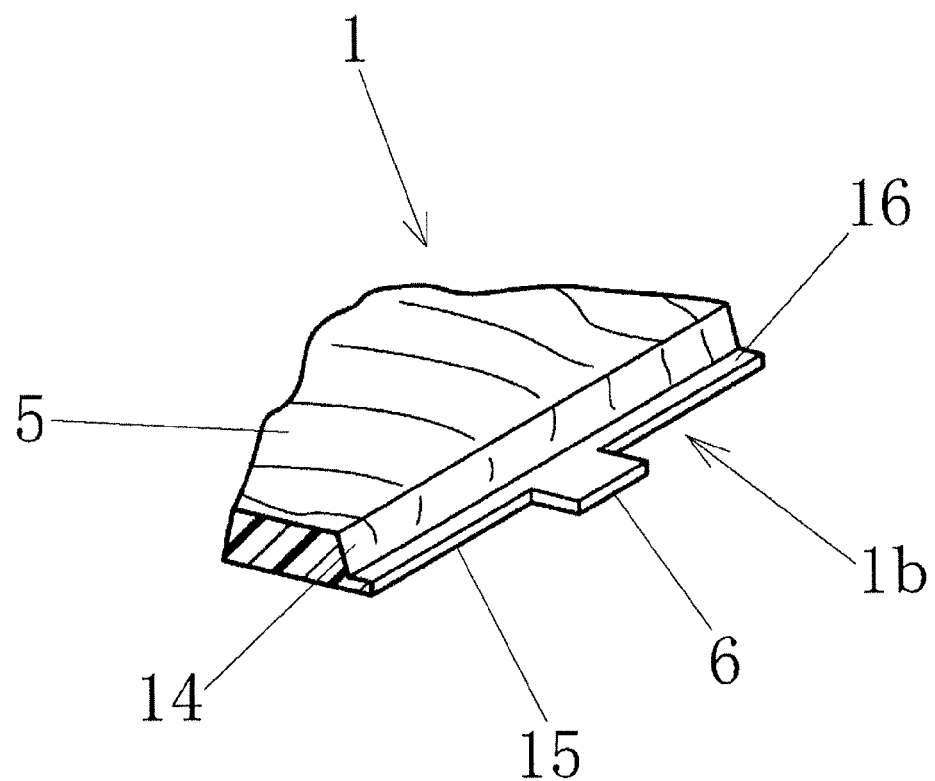
FIG. 4 is an enlarged schematic perspective view of essential portions showing the essential portions of FIG. 3 in an enlarged manner.
Figure 5:
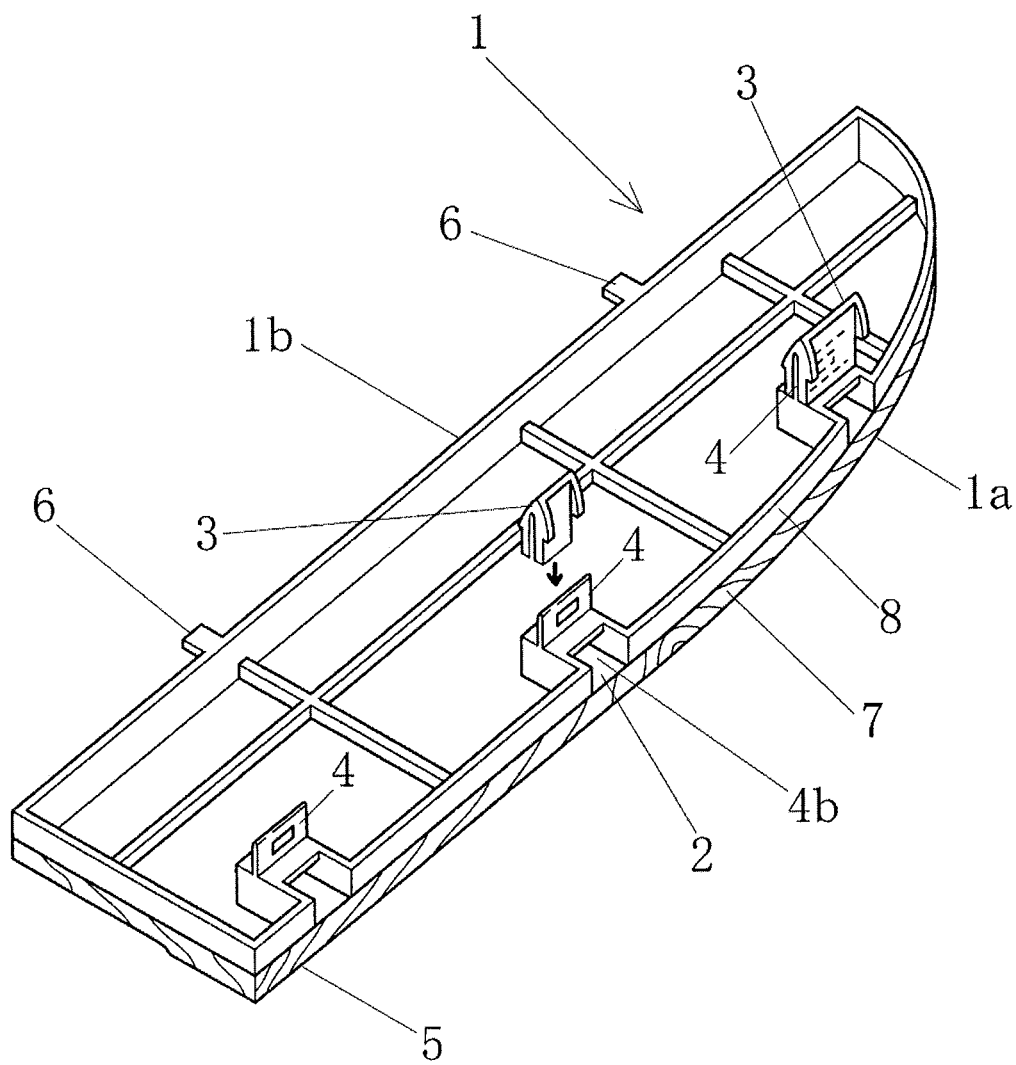
FIG. 5 is a schematic perspective view showing a back face of the decorative panel according to the present invention.
Figure 6:
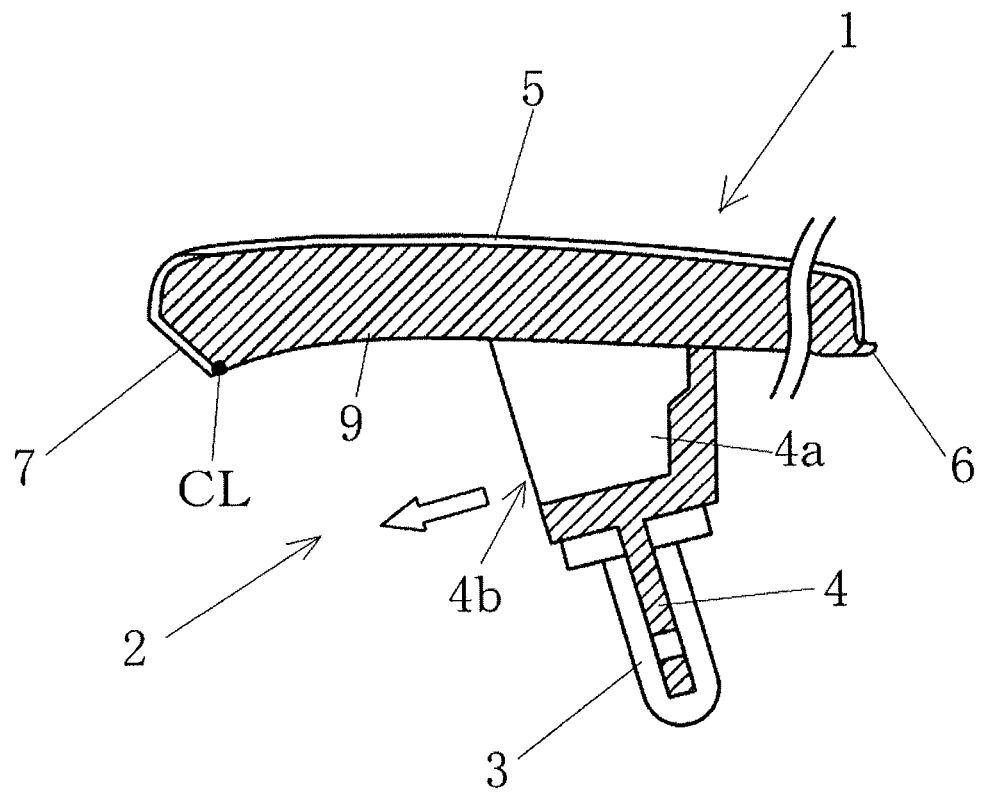
FIG. 6 is a sectional view taken along the line A-A of FIG. 1.
Figure 7:
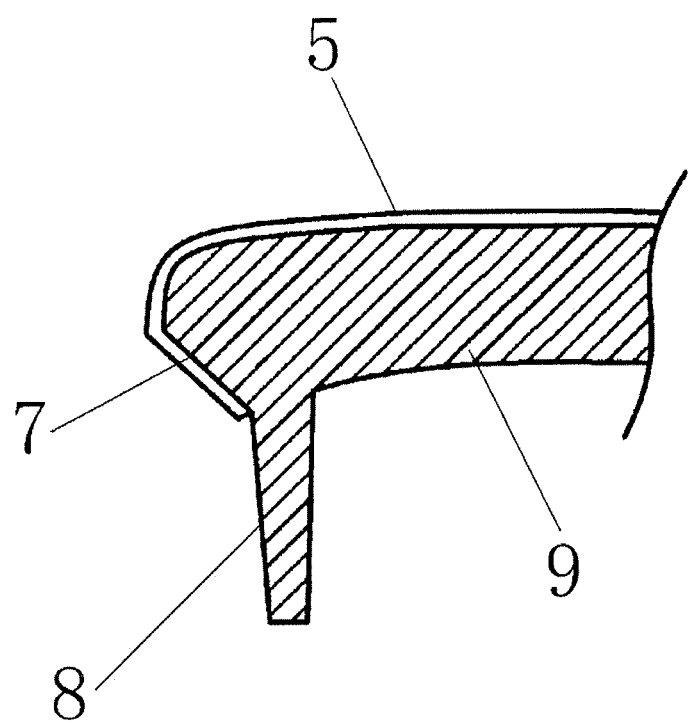
FIG. 7 is a sectional view taken along the line B-B of FIG. 1.
Figure 8:
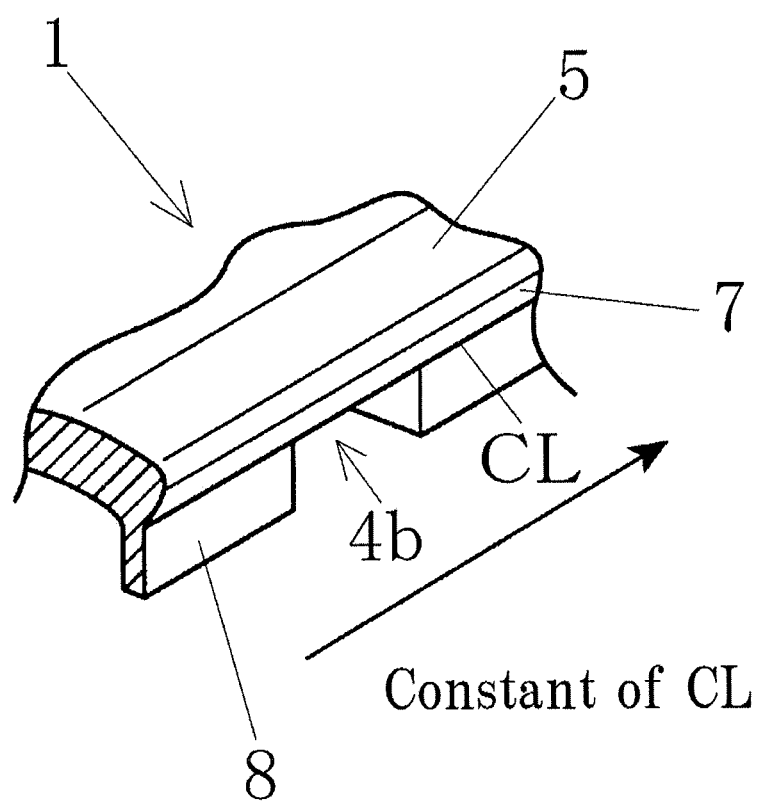
FIG. 8 is an enlarged perspective view of a Z portion of FIG. 1.

FIG. 4 is an enlarged schematic perspective view showing the essential portions of FIG. 3 in an enlarged manner. FIG. 5 is a schematic perspective view showing a back face of the grained panel 1 according to the present embodiment. FIG. 6 is a sectional view taken along the line A-A of FIG. 1. FIG. 7 is a sectional view taken along the line B-B of FIG. 1. FIG. 8 is an enlarged perspective view of a Z portion of FIG. 1.

In addition, the grained panel 1 is provided in such a manner that the curve edge side 1a is shown in FIG. 1, and the straight edge side 1b is shown in FIG. 3 and FIG. 4. As shown in FIG. 5, on the straight edge side 1b of the grained panel 1 (a face that is opposite to a design surface), the clip 3 is provided for mounting the grained panel 1 to the center console 10. This slip 3 is obtained by means of injection molding of a polyacetal resin, for example, and is mounted in such a manner as to be engaged with a clip seat 4 that is integrally molded with a base material 9 (refer to FIG. 6, FIG. 7, and FIG. 10 to be described later). It is to be noted that in a case where the grained panel 1 has been mounted to the center console 10 (a counterpart member) in an openable or closable manner, the curve edge side 1a of the grained panel 1 is configured to open or close with respect to the center console 10, and the straight edge side 1b of the grained panel 1 is fixed with respect to the center console 10.

A circumferential face of the grained panel 1 of the curve edge side 1a, as shown in FIG. 7, is formed in the shape of an acute angle with respect to a top face 1c that is formed in the shape of a substantially horizontal face of the grained panel 1, and in other words, this circumferential face has: a first circumferential face portion 7 that forms a back inclination (refer to FIG. 5 to FIG. 8); and a second circumferential face portion 8 that hangs down while forming a substantially right angle with respect to the top face 1c (refer to FIG. 5, FIG. 7, and FIG. 8). That is, the second circumferential face portion 8 of the circumferential edge portion is inclined so as to hang down with respect to the first circumferential face portion 7. It is to be noted that the circumferential face of the grained panel 1 is corresponding to the circumferential edge portion according to the present invention, that the first circumferential face portion 7 is corresponding to a first face according to the present invention, and that the second circumferential face portion 8 is corresponding to a second face according to the present invention.

As can be understood by referring to FIG. 5 and FIG. 6, a rectangular cutout 2 is provided in the curve edge side 1 of the clip seat 4, enabling die release at the time of molding of the box portion 4a. A relationship is established in such a manner as to remove the second circumferential face portion 8 so as to eliminate an interference with a slide die (not shown) of the second circumferential face portion 8, which would exist in movement trajectory that is obtained by virtually moving an opening portion 4b of the box portion 4a in a substantial slide direction, in other words, leftward on the paper face of FIG. 6, whereby the cutout 2 is provided. As shown in FIG. 5, FIG. 6, and FIG. 8, a part of the second circumferential face portion 8 of the circumferential face of the grained panel 1 is removed at a position that is opposed to the clip 3 on the back face of the grained panel 1. The thus removed portion (the cutout 2) from the second circumferential face portion 8, as shown in FIG. 5, is formed in plurality (three cutouts are formed in the present embodiment), and configures a discontinuous face of the second face according to the present invention.

Figure 10:
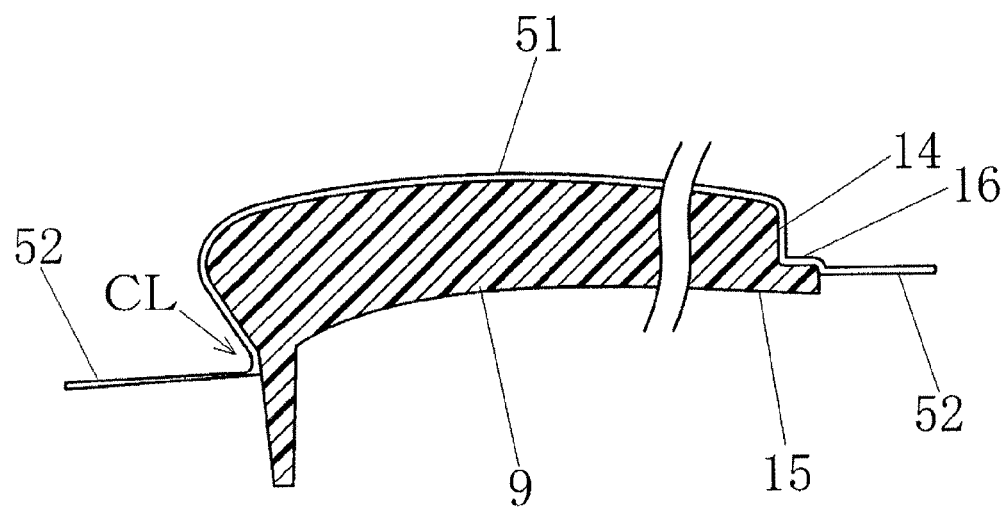
FIG. 10 is a schematic perspective view showing a state in which the base material and a preformed body are integrally molded with each other in the decorative panel according to the present invention.

It is to be noted that the boundary between the first circumferential face portion 7 and the second circumferential face portion 8 serves as a cutting line CL (refer to FIG. 6, FIG. 8, and FIG. 10). It is also to be noted that this boundary is corresponding to a face variation line according to the present invention.

As shown in FIG. 2, a work of engaging the grained panel 1 with its appropriate location is carried out as follows. First, the straight edge side 1b that is formed in the shape of a straight line is oriented obliquely downward; the claw 6 of the straight edge side 1b is then inserted into the tunnel 13 of the center console 10; with this claw 6 being a supporting point, the curve edge side 1a is lowered; and the clip 3 on the curve edge side 1a is engaged with the pit 12 of the center console 10. In this manner, the grained panel 1 is mounted to the center console 10.

Hereinafter, a method for manufacturing the grained panel (a decorative panel 1) by attaching the decoration film 5 to the base material 9 will be described with reference to FIG. 9 and FIG. 10. The grained panel 1 is integrally molded with the base material 9 by means of insertion molding of the decoration film 5. It is to be noted that the decoration film 5 is corresponding to the decoration film according to the present invention.

Figure 9:
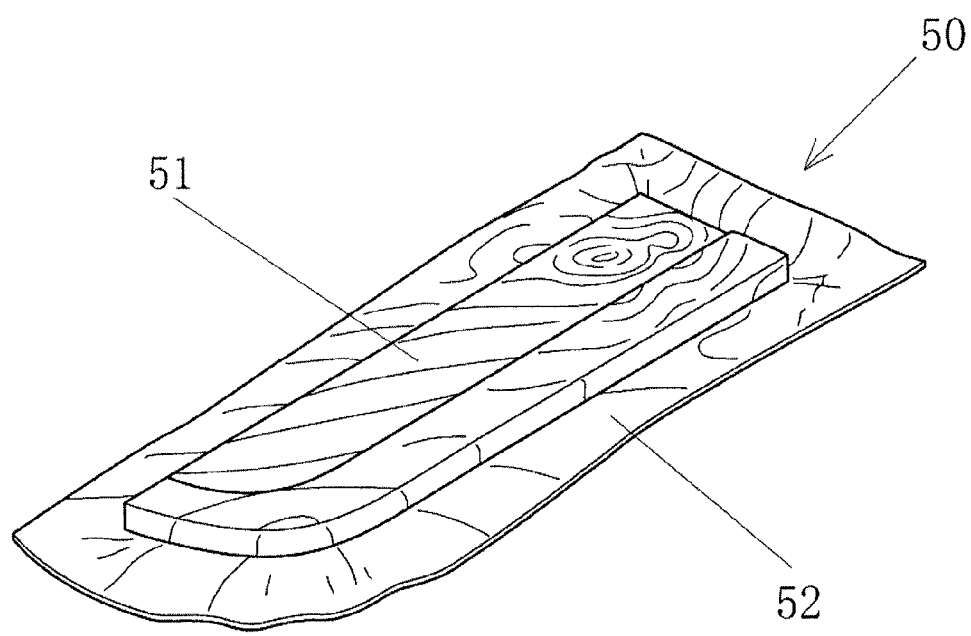
FIG. 9 is a schematic perspective view showing a state in which a decoration film is attached to a base material in the course of molding the decorative panel according to the present invention.

FIG. 9 is a schematic perspective view showing a state in which the decoration film 5 is attached to the base material 9 in the course of molding the grained panel 1 according to the present embodiment. FIG. 10 is a schematic sectional view showing a state in which the base material 9 and a preformed body 50 are integrally molded with each other in the grained panel 1 according to the present embodiment.

The decoration film 5 is utilized as a material sheet that is obtained by photographically producing grains of natural wood for a PET (polyethylene terephthalate) film, an AS (acrylonitrile styrene) film, a PMMA (polymethyl methacrylate) film, a polycarbonate film or the like.

It is to be noted that while in the present embodiment a grain pattern is used, a variety of carbon sheet patterns, a metal-based, non-textile patterns or hairline shaped patterns can be used without being limitative thereto. In addition, apart from the resin sheet, there may be employed a material with a jersey woven cloth or the like overlapped on the basis of the resin sheet, or alternatively, a sheet cloth with a synthetic leather serving as a top layer.

A preformed body (a preliminary mold body) 50 is prepared in advance by: overlapping the above mentioned material sheet that is heated and softened in an incorporation die (a male die or a female die), applying a differential pressure molding (a vacuum molding or an air pressure molding) to the overlapped material sheet; incorporating a product portion 51 that is formed in the shape of the grained panel 1 in its appropriate location; and forming an excess length portion 52 at an outer circumferential portion thereof (refer to FIG. 9).

The base material 9 is used an ABS resin or a polycarbonate resin or the like. This base material 9 is mounted, for example, by being adsorbed to a side forming a design surface that is one of a pair of halves of an injection mold die, although not shown, the injection mold die is closed and then a resin in its molten state is injected into a die.

It is to be noted that in FIG. 10, there is shown a cross section of a state in which the base material 9 and the preformed body 50 are integrally molded with each other. Next, the excess length portion 52 is cut out (a trimming process). This excess length portion 52 of the decoration film 5 is formed on the outer circumference of a product portion that is formed in the shape of the grained panel 1, and is formed in such a manner as to be bent from a boundary portion between the first circumferential face portion 7 and the second circumferential face portion 8. This excess length portion 52 is formed in such a manner as to be substantially parallel to the design surface of the grained panel 1 and to be orthogonal to the second circumferential face portion 8. In addition, the excess length portion 52 is processed to be trimmed along the boundary between the first circumferential face portion 7 and the second circumferential face portion 8, whereby on the decoration film 5, a trimming terminal portion CL is formed along the boundary (the face variation line) of the first circumferential face portion 7 and the second circumferential face portion 8.

Here as shown in FIG. 10, the cutting line CL is a boundary between the first circumferential face portion 7 and the second circumferential face portion 8, and even in the case of a manual work to be carried out by a worker using a trimming machine or a folded-blade cutter or the like that is provided with a cutter blade that moves straightway in a transverse direction, a tip end of the cutter blade is aligned to the cutting line CL, and the curve edge side 1a is cut straightway in a transverse direction, in other words, in a longitudinal direction of the grained panel 1, whereby a trimming work is carried out. The grain sheet (the decoration film) 5 that is involved at an acute angle on the first circumferential face portion 7 is then trimmed at a portion that disappears in the recessed portion 11 of the center console 10 off of an external design portion.

The straight edge side 1b can also be processed to be trimmed in a manner similar to that of the curve edge side 1a described above. As shown in FIG. 4 and FIG. 10, the claw 6 is extended from a rib 15 in a transverse direction, a corner 16 is provided at a boundary portion with a longitudinal wall 14, a cutter blade is applied to this corner 16, the cutter blade is moved along the corner 16 and then the decoration film 5 is trimmed (cut off) at a lower end of the longitudinal wall 14.

The decoration film 5 and the base material 9 are brought into an intimate contact with each other, and however, a cutting line is provided by means of the cutter blade all over the entire periphery of the grained panel 1 and then the excess length portion 52 is taken and torn off, whereby the excess length portion 52 can be removed in a state in which the product portion 51 is left as it is.

While the present invention has been described in detail hereinbefore by way of embodiment described above, it is self-evident to one skilled in the art that the present invention is not limited to the embodiment described in the present specification. The present invention can be carried out as an alteration mode or a modification mode without deviating from the subject matter and scope of the present invention defined by the claims that follow. Therefore, the descriptive matters of the present specification are merely provided for the sake of an illustrative or explanatory purpose, and do not have any limitative meaning to the present invention.

INDUSTRIAL APPLICABILITY

The present invention can be utilized as a decorative panel of interior components for the vehicle such as a console box, an instrument panel, a glove box, a door trim for the vehicle, or alternatively, a decorative panel of exterior components for the vehicle such as a back door garnish.

What is claimed is:
1. A decorative panel comprising:
a design surface; and
a circumferential edge portion that is formed so as to cross from the design surface, wherein the circumferential edge portion has a first face that is continuous from the design surface along a circumferential extension direction and a second face that is formed in a circumferential extension direction along the first face,
wherein the first face and the second face intersect with each other at a face variation line,
wherein the decorative panel is provided in a manner in which a decoration film is imparted to at least a part of the design surface and a part of the circumferential edge portion, and
wherein the decoration film includes a trimming terminal portion along the face variation line.
2. The decorative panel according to claim 1,
the second face including a discontinuous portion.
3. The decorative panel according to claim 1,
wherein the first face of the circumferential edge portion is configured so as to be inclined at an acute angle with respect to the design surface that is a top face of the decorative panel, and
wherein the second face of the circumferential edge portion is inclined so as to hang down with respect to the first face, and is configured to form a substantially right angle with respect to the design surface.
4. The decorative panel according to claim 1,
wherein the decoration film is configured to be involved at an acute angle on the first face.
5. The decorative panel according to claim 1,
wherein the decoration film has an excess length portion that is formed on an outer circumference of a product portion that is formed in a shape of the decorative panel, the excess length portion being formed to be bent from a boundary portion between the first face and the second face, and
wherein the rimming terminal portion is formed by the excess length portion being processed to be trimmed along the face variation line.
6. The decorative panel according to claim 5,
wherein the decoration film is configured with: a preformed body having a product portion that is formed in a shape of the decoration panel; and the excess length portion that is formed at an outer circumferential portion thereof, by means of preliminary molding.
7. The decorative panel according to claim 6,
wherein the decoration film that is made of the preformed body is integrally molded with a base material of the decorative panel and thereafter trimming processing of the excess length portion is carried out.
8. The decorative panel according to claim 2,
wherein the decorative panel is formed in a knife shape, and has a curve edge side and a straight edge side, and wherein the discontinuous portions including the discontinuous portion on the second face in the circumferential edge portion are provided at least one or more on the curve edge side.

9. A vehicle interior/exterior components that are provided at an interior or an exterior of a vehicle, the vehicle interior/exterior components comprising:
   a decorative panel according to claim 1, having a mount portion; and
   a target mount portion to which the mount portion is mounted, and which is configured to attach the decorative panel to the vehicle interior/exterior components.

* * * * *